(12) United States Patent
Kimura et al.

(10) Patent No.: US 6,695,035 B2
(45) Date of Patent: Feb. 24, 2004

(54) ELECTROMAGNETIC INDUCTION CASTING APPARATUS

(75) Inventors: Naritoshi Kimura, Amagasaki (JP); Kenichi Sasatani, Ibaraki (JP); Kyojiro Kaneko, Saint-Martin d'Heres (FR)

(73) Assignee: Sumitomo Mitsubishi Silicon Corporation, Tokyo (JP)

( * ) Notice: Subject to any disclaimer, the term of this patent is extended or adjusted under 35 U.S.C. 154(b) by 0 days.

(21) Appl. No.: 09/962,796

(22) Filed: Sep. 26, 2001

(65) Prior Publication Data

US 2003/0205358 A1 Nov. 6, 2003

(51) Int. Cl.[7] .................. B22D 27/02; B22D 27/04
(52) U.S. Cl. .................. 164/507; 164/513; 164/338.1; 373/138
(58) Field of Search .................. 164/471, 493, 164/507, 513, 122.1, 122.2, 338.1; 373/138, 144

(56) References Cited

U.S. PATENT DOCUMENTS 4,915,723 A  *  4/1990  Kaneko et al. ............... 65/144

* cited by examiner

Primary Examiner—Kuang Y. Lin
(74) Attorney, Agent, or Firm—Morrison & Foerster LLP

(57) ABSTRACT

To restrict to a low level a temperature gradient of an ingot immediately after solidification in a bottomless crucible in a electromagnetic induction casting method using an electrically conductive bottomless crucible. An upper section and a lower section of an electrically conductive bottomless crucible to be disposed inside an induction coil are configured as a water-cooled section and a non-water-cooled section. Both the water-cooled section and the non-water-cooled section are divided by vertical slits into a plurality of portions in a circumferential direction. Rapid cooling with water in the lower section of the crucible is restricted.

8 Claims, 8 Drawing Sheets

ELECTROMAGNETIC INDUCTION

ELECTROMAGNETIC INDUCTION CASTING APPARATUS

BACKGROUND OF THE INVENTION

1. Field of the Invention

The present invention relates to an electromagnetic induction casting apparatus which is used, for example, to manufacture a silicon ingot for a solar cell.

2. Description of the Prior Art

As one of methods for manufacturing unidirectionally solidified ingots of silicon used in solar cells, an electromagnetic induction casting method disclosed in Japanese Patent Laid-Open Nos. 2-30698, 4-338195 are known, for example. A typical electromagnetic induction casting method uses an induction coil 3, an electrically conductive bottomless crucible 2 which is disposed inside the induction coil 3 and a heat insulating furnace 4 which is disposed under the bottomless crucible 2 as shown in FIG. 8.

The electrically conductive bottomless crucible 2 has a structure in which at least a vertical portion is divided by vertical slits 2', 2', . . . into a plurality of vertically elongated sections 2", 2", . . . in a circumferential direction, cooperates with the induction coil 3 to electromagnetically melt a raw material supplied into the above described crucible and then allow the melt of raw material to be solidified. In order to solidify the melt of raw material and protect the crucible, the bottomless crucible 2 is configured to have a water-cooled structure which allows cooling water to pass through the bottomless crucible 2.

The heat insulating furnace 4 controls a temperature gradient by heating a solidified ingot which is pulled downward from the bottomless crucible with an electric heater 5.

Since the electrically conductive bottomless crucible 2 is divided by the vertical slits 2', 2', . . . into the plurality of vertically elongated sections 2", 2", . . . , the electromagnetic induction casting method not only heats and melts the raw material in the crucible by electromagnetic induction but also produces a repulsive force between the crucible and the raw material in the crucible, thereby lessening contact between the crucible and the raw material. When contact is lessened as described above, the raw material is less contaminated, a product quality is improved, the mold is not consumed substantially and an equipment cost is lowered. Furthermore, a casting efficiency is improved by continuous casting. Accordingly, a high quality silicon ingot is manufactured economically.

In relation to the electrically conductive crucible 2 which has the water-cooled structure, however, this electromagnetic induction casting method poses problems which are described below.

The inventors have long been making researches to manufacture a high quality silicon ingot for a solar cell by the electromagnetic induction casting method. In the course of these researches, the inventors found that the performance of silicon ingot as a solar cell was improved with a leap by controlling a temperature gradient of silicon within a range of 15 to 25° C. in a relatively narrow temperature range from 1420° C. which is a melting point of silicon to 1200° C. and disclosed this knowledge by Japanese Patent Laid-Open No. 4-342496.

Reasons why the control of the temperature gradient is effective for the performance improvement consist in a fact that a large number of defects which lower a photoelectric conversion efficiency of a solar cell are produced while silicon passes through the temperature range from 1420° C. to 1200° C., a fact that thermal stresses produced in crystals are moderated and production of crystalline defects is prevented by lowering a temperature gradient in this temperature range and the like.

A conventional electromagnetic induction casting apparatus has a heat insulating furnace 4 which is disposed under a bottomless crucible 2 and is capable of controlling a temperature gradient of an ingot after the ingot is pulled down under the bottomless crucible 2. By the way, an ingot temperature at an upper end of the heat insulating furnace is 1300 to 1000° C. However, an inside surface of the bottomless crucible 2 is cooled with water to 200° C. or lower. Accordingly, silicon in the bottomless crucible is rapidly cooled with the inside surface of the crucible which is forcibly cooled with water, whereby too large temperature gradient can hardly be restricted even with the heat insulating furnace 4 within a range of 15 to 25° C./cm in the temperature range from 1420° C. to 1200° C. which produces a large influence on the performance of the silicon ingot as a solar cell.

In addition to the rapid cooling of silicon in the bottomless crucible, the temperature gradient is partially improved due to an rapid temperature change from a low temperature zone (200° C. or lower) of the inside surface of the crucible to the upper end of the heat insulating furnace (on the order of 1300 to 1000° C.). Silicon which is a fragile material is apt to be cracked due to the rapid cooling and the partial improvement of the temperature gradient.

BRIEF SUMMARY OF THE INVENTION

Object of the Invention

An object of the present invention is to provide an electromagnetic induction casting apparatus which is capable of restricting a temperature gradient of an ingot within a narrow range immediately after solidification in an electrically conductive bottomless crucible.

SUMMARY OF THE INVENTION

In order to accomplish the above described object, an electromagnetic induction casting apparatus according to the present invention is an electromagnetic induction casting apparatus configured to electromagnetically melt a raw material in an electrically conductive bottomless crucible which is disposed inside an induction coil and has at least a vertical portion divided by vertical slits into a plurality of portions in a circumferential direction, and pull down the melt of raw material downward while allowing the raw material to be solidified, wherein an upper section and a lower section of the above described electrically conductive bottomless crucible are configured as a water-cooled section and a non-water-cooled section respectively, and at least a vertical portion of the water-cooled section and at least a vertical portion of the non-water-cooled section are divided by vertical slits into a plurality of portions in the circumferential direction.

The upper section of the bottomless crucible must have a cooling capability sufficient for starting solidification of melt. For this reason, it is necessary to cool the upper section of the bottomless crucible with water and it is preferable for obtaining the cooling capability to make the upper section of the bottomless crucible a metal having a high heat conductivity such as copper, silver or the like.

For the lower section of the bottomless crucible which faces a skin of a solidified ingot, on the other hand, a water-cooling structure will cool the lower section excessively, thereby causing excessive cooling of the ingot immediately after solidification. Accordingly, a non-water-cooling structure is adopted for the lower section of the bottomless crucible. Since the non-water-cooled lower section is an electrically conductive section and has the slits like the upper water-cooled section, even the non-water-cooled lower section is capable of positively heating inside of the crucible by electromagnetic induction like the upper section of the crucible. In addition, the non-water-cooled section is heated and the ingot can be heated by radiation from the non-water-cooled section.

Owing to the items described above, the electromagnetic induction casting apparatus according to the present invention is capable of preventing an ingot from being cooled excessively in the lower section of the bottomless crucible and restricting a temperature gradient of the ingot immediately after solidification. Furthermore, the electromagnetic induction casting apparatus according to the present invention moderates an rapid temperature change from the bottomless crucible to the heat insulating furnace, thereby preventing the temperature gradient from being partially improved due to the temperature change.

It is preferable that the non-water-cooled section has a slit length at a ratio of 10 to 50% of a total slit length. At a ratio of lower than 10%, it will be difficult to carry out induction heating effectively inside the lower section of the crucible. At a ratio of higher than 50% on the other hand, a solidification start line (a triple point of the melt, the crucible and a solidified portion) will be brought into contact with the lower section of the crucible and a cooling effect sufficient for starting solidification will not be obtained, thereby making it difficult to solidify the melt stably and resulting in a possibility of the leakage of the melt.

A total height of the bottomless crucible, a height of the water-cooled section and a height of the non-water-cooled section are set so that the above described slit length can be obtained. For reference, a total slit height is on the order of 400 to 500 mm.

It is preferable to form slits continuously from the water-cooled section to the non-water-cooled section by connecting the slits in the water-cooled section to the slits in the non-water-cooled section. When the slits are formed as described above, an electromagnetic force is not discontinuous even in the vicinity of a boundary between the water-cooled section and the non-water cooled section. Accordingly, casting is more stabilized and an energy efficiency is improved.

As a material for the non-water-cooled section, it is preferable to select an electrically conductive material having a high melting point such as molybdenum, tungsten, titanium or the like. Such a material poses no problem even when the non-water-cooled section is partially heated to a high temperature exceeding 1000° C.

The induction coil outside the crucible can be disposed independently outside the water-cooled section and the non-water-cooled section of the bottomless crucible, respectively. When induction coils are disposed independently as described above, heating of an interior of the non-water-cooled section is accelerated and a control accuracy of a heating temperature is improved. Accordingly, a temperature gradient is restricted more effectively.

The bottomless crucible may be of an assembling type which can be separated into the water-cooled section and the non-water-cooled section. The assembling type crucible can easily be restored when the crucible is deformed. Furthermore, the assembling type crucible permits partial exchange of the crucible and lowers a cost required for exchange.

The electromagnetic induction casting apparatus according to the present invention is suited to manufacturing of a silicon ingot, poly-silicon ingot for a solar cell in particular, and is applicable also to manufacturing of other semiconductors and metals.

DETAILED DESCRIPTION OF THE PREFERRED EMBODIMENTS

Figure 1:
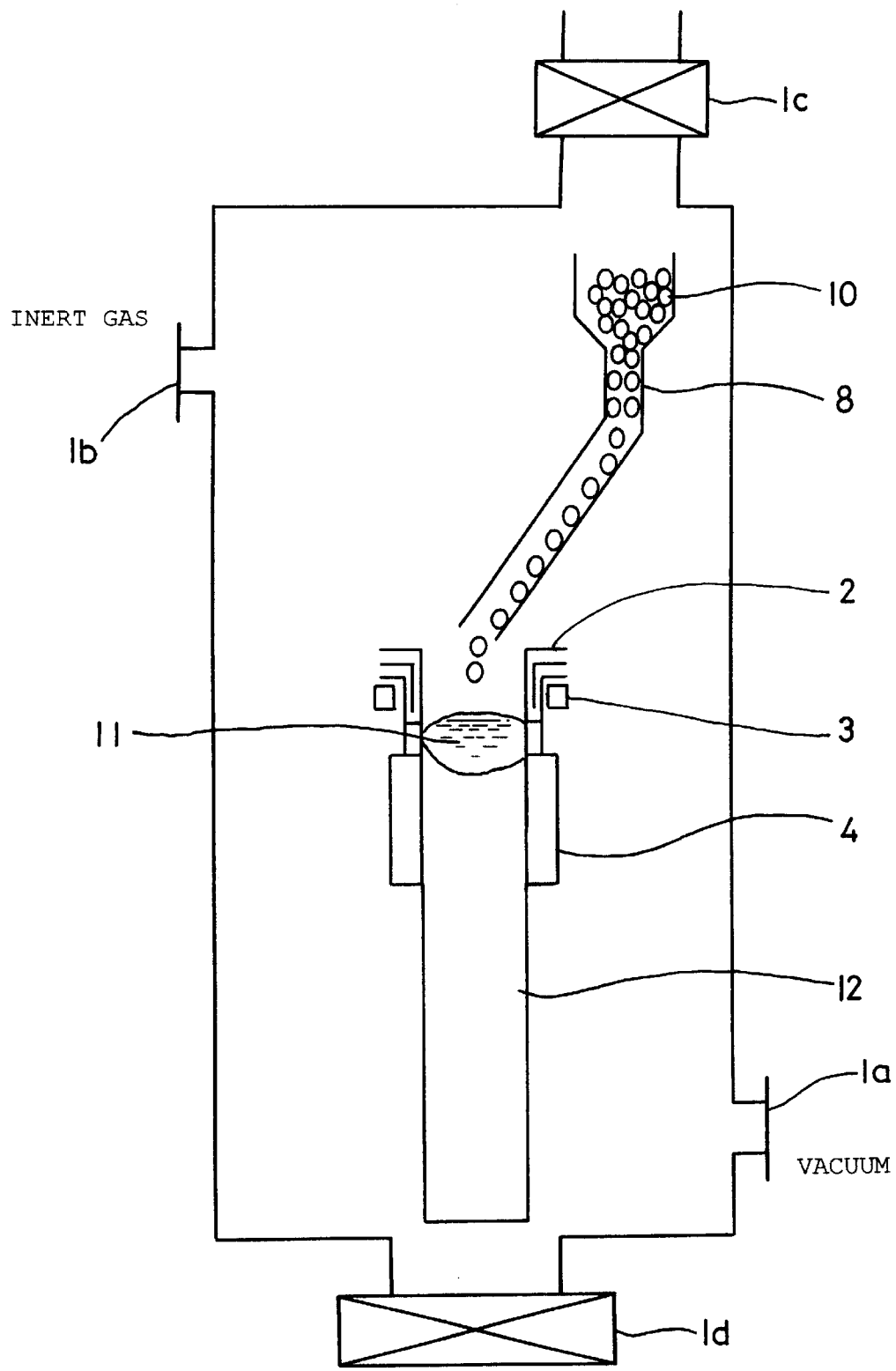
FIG. 1 is a diagram showing an overall configuration of an electromagnetic induction casing apparatus according to a first embodiment of the present invention.

Now, embodiments of the present invention will be described with reference to the accompanying drawings. FIG. 1 is a diagram showing an overall configuration of an electromagnetic induction casting apparatus according to a first embodiment of the present invention, FIG. 2 is an oblique section showing main members of the electromagnetic induction casting apparatus and FIG. 3 is a vertical section showing the main members of the electromagnetic induction casting apparatus in a casting condition.

The electromagnetic induction casting apparatus according to the first embodiment comprises an airtight chamber 1 for maintaining a casting atmosphere as shown in FIG. 1. In order to maintain this atmosphere, a gas inlet port 1b is disposed on a side of an upper section of the airtight chamber 1 and a gas exhaust port 1a is disposed on a side of a lower section, respectively. Furthermore, a raw material charging port 1c is disposed on a top surface of the airtight chamber 1 and an ingot outlet port 1d is disposed on a bottom surface, respectively.

Disposed in the airtight chamber 1 is a vertical type cylindrical bottomless crucible 2 which is made of an electrically conductive material. An induction coil 3 is disposed with a gap outside the bottomless crucible 2. A heat insulating furnace 4 is disposed continuously under the bottomless crucible 2, whereas a raw material charging device 8 is disposed over the bottomless crucible 2 to charge a raw material into the bottomless crucible 2.

Figure 2:
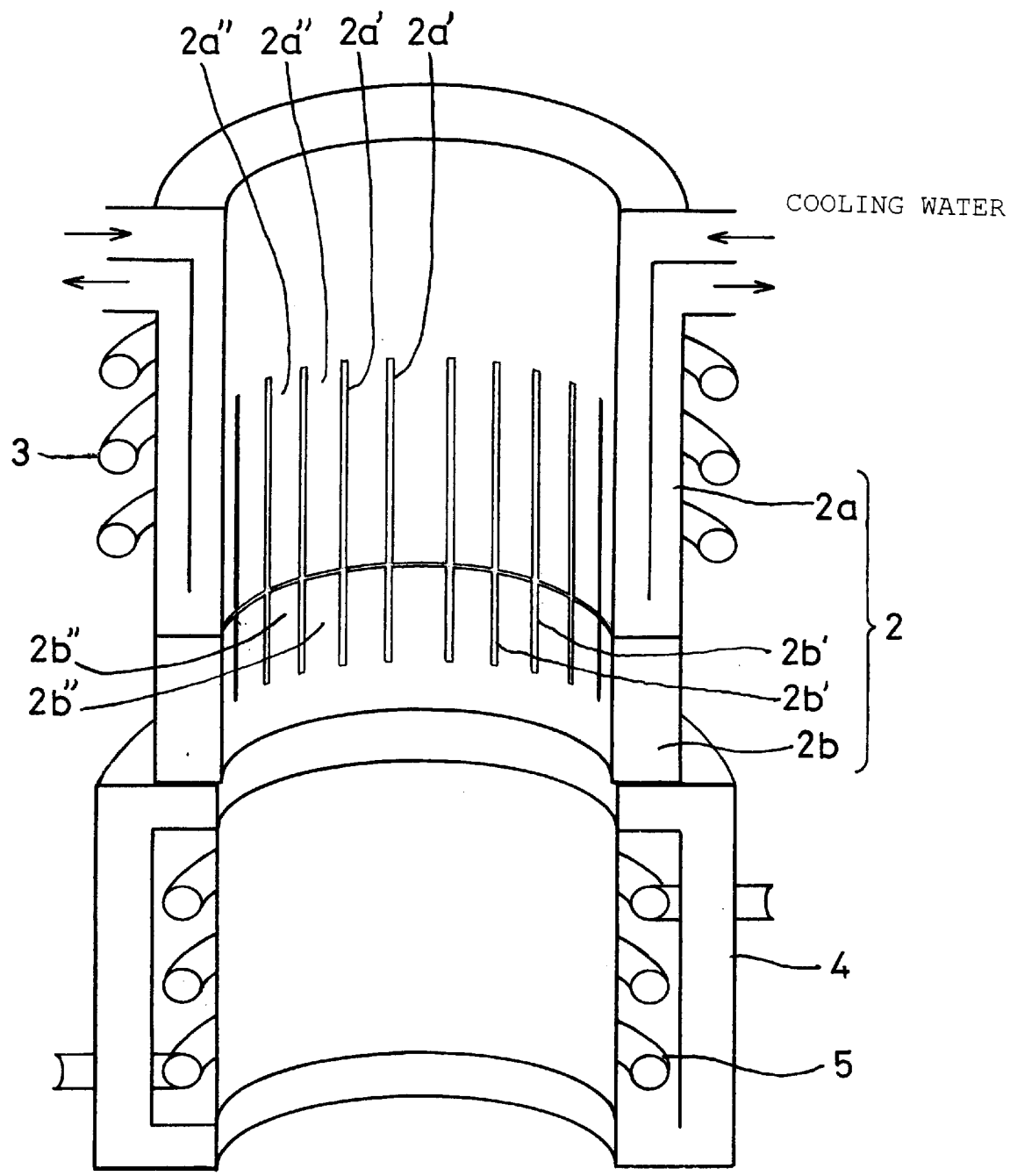
FIG. 2 is an oblique section showing main members of the electromagnetic induction casting apparatus.
Figure 3:
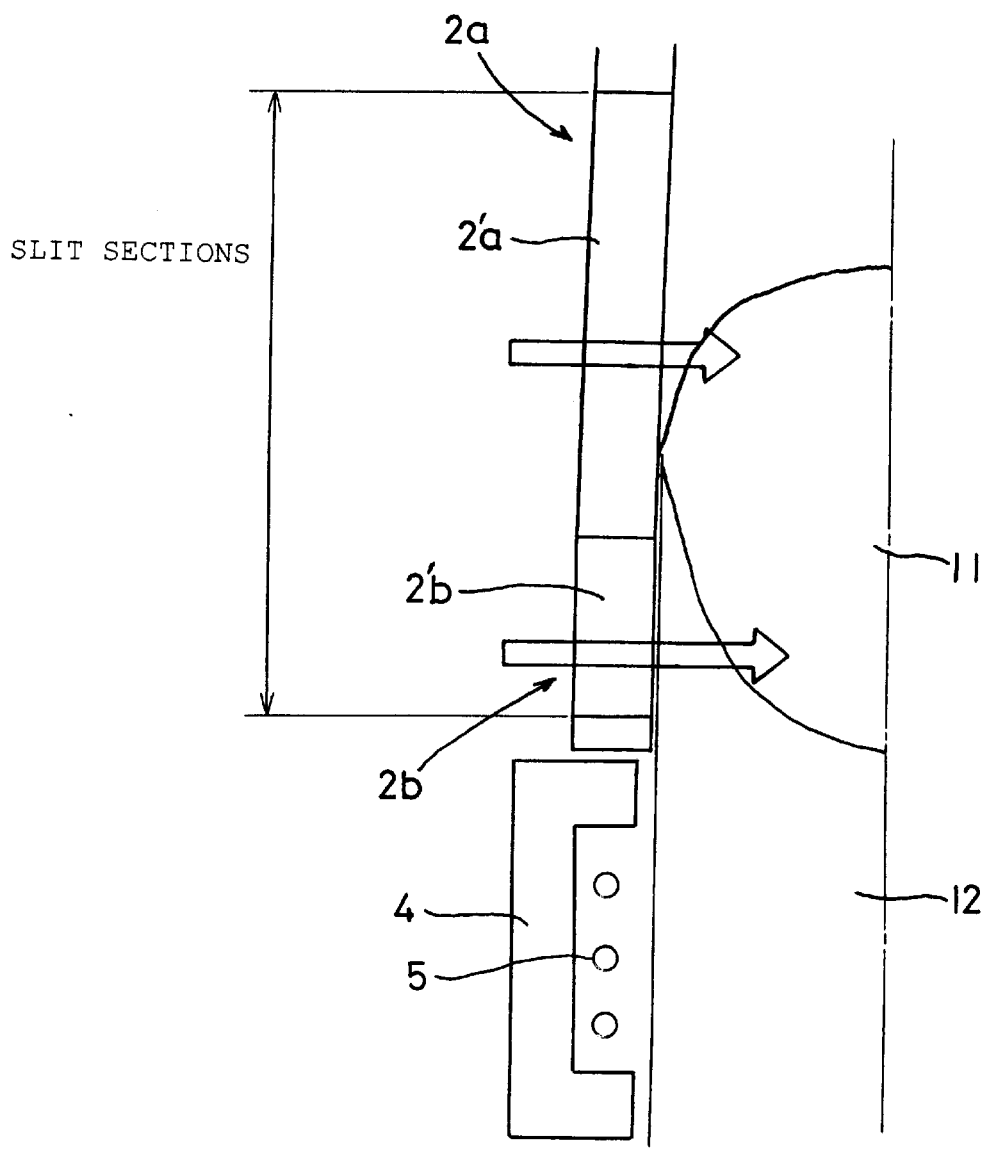
FIG. 3 is a vertical section showing the main members of the electromagnetic induction casting apparatus in a casting condition.

The bottomless crucible 2 is divided into two sections of an upper water-cooled section 2a and a lower non-watercooled section 2b, and the induction coil 3 is disposed outside the water-cooled section 2a as shown in FIG. 2.

The water-cooled section 2a has a lower portion under a middle part which is divided by slits 2a', 2a', . . . into a plurality of vertically elongated portions 2a", 2a", . . . in a circumferential direction. An interior of the water-cooled section 2a is divided into first inside chambers and second outside chambers for the vertically elongated portions 2a", 2a", . . . Cooling water which flows into the water-cooled section 2a from a top end portion passes by the vertically elongated portions 2a", 2a", . . . from inside to outside and flows out of the water-cooled section 2a from the top end portion.

The water-cooled section 2a is made of a material such as copper which is excellent in both heat conduction and electrical conduction.

The non-water-cooled section 2b is made of molybdenum which is an electrically conductive metal having a high melting point and has no water-cooled structure unlike the water-cooled section 2a. The non-water-cooled section 2b is divided by vertical slits 2b', 2b', . . . into a plurality of vertically elongated portions 2b", 2b", . . . in the circumferential direction, except for a portion of the non-water-cooled section which is located lower.

The vertically elongated portions 2a", 2a", . . . of the water-cooled section 2a and the vertically elongated portions 2b", 2b", . . . of the non-water-cooled section 2b have an identical pitch. Corresponding vertically elongated portions are joined to each other by brazing or the like, whereby the water-cooled section 2a and the non-water-cooled section 2b are integrated with each other. Furthermore, the slits 2a', 2a', . . . of the water-cooled section 2a are communicated with the slits 2b', 2b', . . . of the non-water-cooled section 2b respectively, thereby forming a plurality of slits which are continuous from the water-cooled section 2a to the non-water-cooled section 2b.

Since the water-cooled section 2a is joined with the non-water-cooled section 2b, the bottomless crucible 2 has a structure in which the top end portion and a bottom end portion are integrated in the circumferential direction. That is, the bottomless crucible has a structure in which the vertically elongated portions have upper and lower ends which are not free. This structure improves mechanical strength of the bottomless crucible 2 and prevents the crucible from being deformed.

From an aspect of electromagnetic induction, an electromagnetic force is exerted to prevent the melt from being brought into contact with the crucible even in the vicinity of the boundary between the water-cooled section 2a and the non-water-cooled section 2b owing to the plurality of slits (vertically elongated portions) formed continuously from the water-cooled section 2a to the non-water-cooled section 2b, whereby the electromagnetic induction casting apparatus is capable of casting stably. Furthermore, an energy efficiency becomes also high owing to positive heating of the melt by the electromagnetic induction. When the continuous slits (vertically elongated portions) are not formed, an electromagnetic shielding function is produced in the vicinity of the boundary between the water-cooled section 2a and the non-water-cooled section 2b, whereby the electromagnetic force is not exerted to the melt even locally and a heating effect owing to the electromagnetic induction is hindered.

The heat insulating furnace 4 which is disposed under the bottomless crucible 2 comprises an electric heater 5 for keeping the ingot warm.

When a silicon ingot is to be manufactured with the electromagnetic induction casting apparatus according to the first embodiment, granular poly-silicon is first charged as a casting raw material 10 through the raw material charging port 1c into the raw material charging device 8 in the airtight chamber 1. After the raw material charging port 1c is closed, the airtight chamber 1 is evacuated to vacuum through the exhaust port 1a and an inert gas is introduced into the airtight chamber 1 through the gas inlet port 1b while maintaining a predetermined vacuum.

In a condition where a bottom portion of the bottomless crucible 2 is closed with a dummy ingot, the casting raw material 10 is charged from the raw material charging device 8 into the bottomless crucible 2. An alternating current having a predetermined frequency is supplied to the induction coil 3 to melt the casting raw material 10 in the bottomless crucible 2. By lowering the dummy ingot while replenishing the casting raw material 10 into the bottomless crucible 2, a unidirectionally solidified silicon ingot 12 is manufactured continuously. The manufactured ingot 12 is taken out of the airtight chamber 1 through the ingot outlet port 1d.

At this time, the casting raw material 10 charged into the bottomless crucible 2 is melted into melt 11 in the water-cooled section 2a of the bottomless crucible 2 by the induction coil 3 disposed outside the water-cooled section 2a of the bottomless crucible 2 as shown in FIG. 1, FIG. 2 and FIG. 3. The melt 11 is cooled rapidly with an inside surface of the water-cooled section 2a, which is cooled with water and solidified from outside into an ingot 12.

The bottomless crucible 2 consists of the upper water-cooled section 2a and the lower non-water-cooled section 2b. In the water-cooled section 2a, the raw material 10 is heated by induction into the melt 11 inside a portion in which the slits 2a', 2a', . . . are formed (slit portion), and the melt 11 is cooled rapidly with the inside surface of the water-cooled section 2a, which is cooled with water and is solidified from outside. The non-water-cooled section 2b restricts cooling of a solidified portion as compared with the conventional water-cooled structure. Moreover, the solidified portion is positively kept warm by induction heating inside a portion in which the slits 2b', 2b', . . . are formed (slit portion). The solidifed portion is kept warm continuously in the heat insulating furnace 4 disposed under the bottomless crucible 2.

Accordingly, a temperature gradient of the silicon ingot 12 is restricted immediately after solidification in the bottomless crucible 2. Furthermore, a rapid temperature change from the bottomless crucible 2 to the heat insulating furnace 4 is moderated and the temperature gradient is prevented from being partially enhanced due to the temperature change. As a result, the electromagnetic induction casting apparatus is capable of restricting the temperature gradient within a range of 15 to 25° C./cm in the temperature range from 1420° C. to 1200° C. which produces a large influence on the performance of silicon ingot 12 as a solar cell, thereby improving the performance of silicon ingot 12. Furthermore, the electromagnetic induction casting apparatus is capable of preventing the silicon ingot 12 from being cracked.

Figure 4:
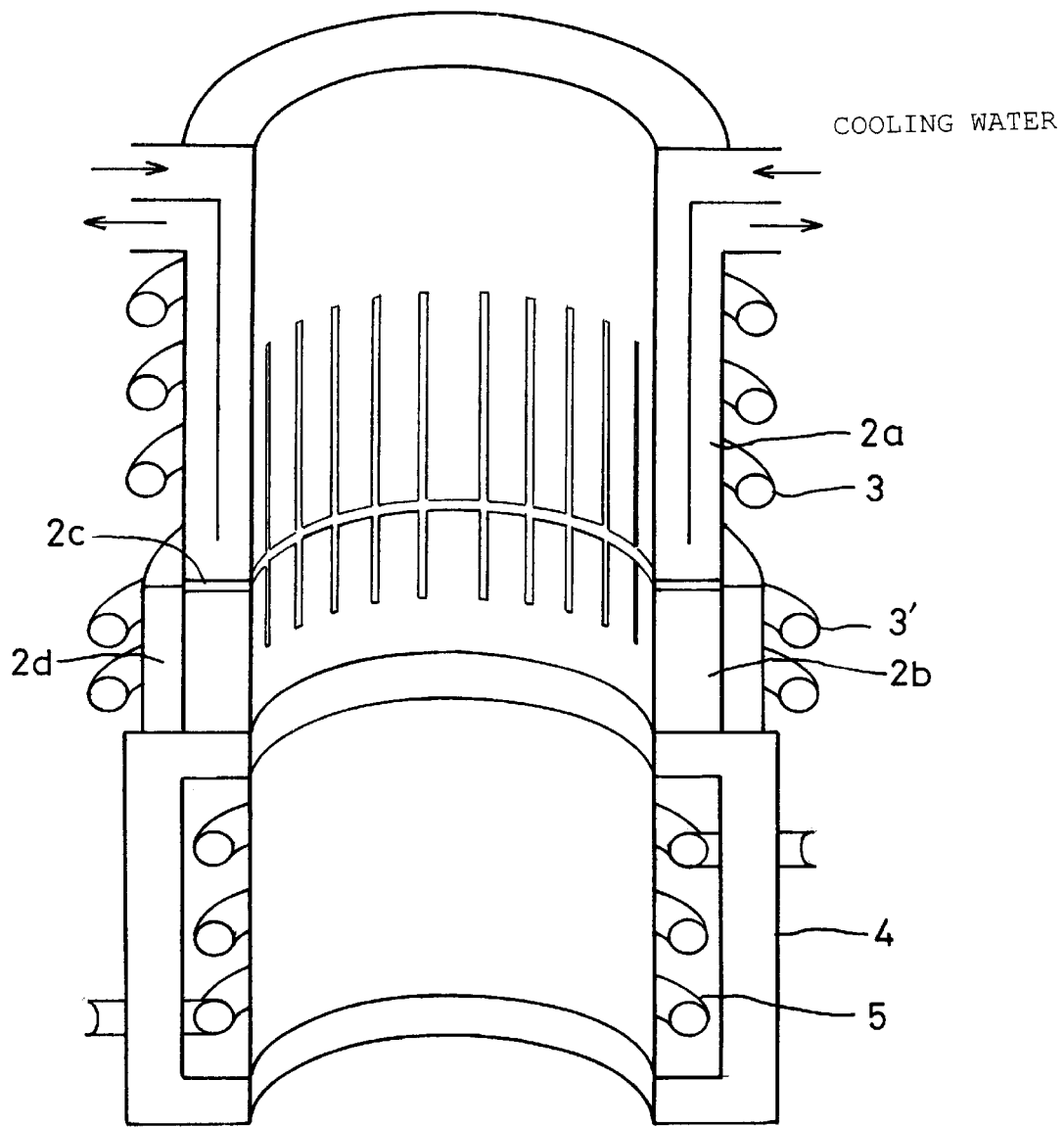
FIG. 4 is an oblique section showing main members of an electromagnetic induction casting apparatus according to a second embodiment of the present invention.

FIG. 4 is an oblique sectional view showing main members of an electromagnetic induction casting apparatus according to a second embodiment of the present invention.

In the electromagnetic induction casting apparatus according to the second embodiment, a heat insulating barrier 2c is disposed between a water-cooled section 2a and a non-water-cooled section 2b of a bottomless crucible 2. Disposed outside the non-water-cooled section 2b is an induction coil 3' which is independent from an induction coil 3 disposed outside the water-cooled section 2a and a gas cooler 2d which is in contact with an outside surface of the non-water-cooled section 2b.

The heat insulating barrier 2c which is disposed between the water-cooled section 2a and the non-water-cooled section 2b prevents heat from being taken from the non-water-cooled section 2b to the water-cooled section 2a. The heat insulating barrier 2c which is an insulating member does not substantially hinder electromagnetic continuity of the slits 2a' and 2b'. When the induction coil 3' and the gas cooler 2d are disposed newly outside the non-water-cooled section 2b, the electromagnetic induction casting apparatus is capable of controlling a heating temperature independently inside the non-water-cooled section 2b. By using either or both of the induction coil 3' and the gas cooler 2d independently or in combination, it is possible to control a temperature gradient of the silicon ingot 12 more precisely immediately after solidification in the bottomless crucible 2.

For the electromagnetic induction casting apparatus according to the above described first embodiment, a temperature gradient is adjustable by adjusting a length of the slits 2b', 2b', . . . in the non-water-cooled section 2b or the like.

Figure 5:
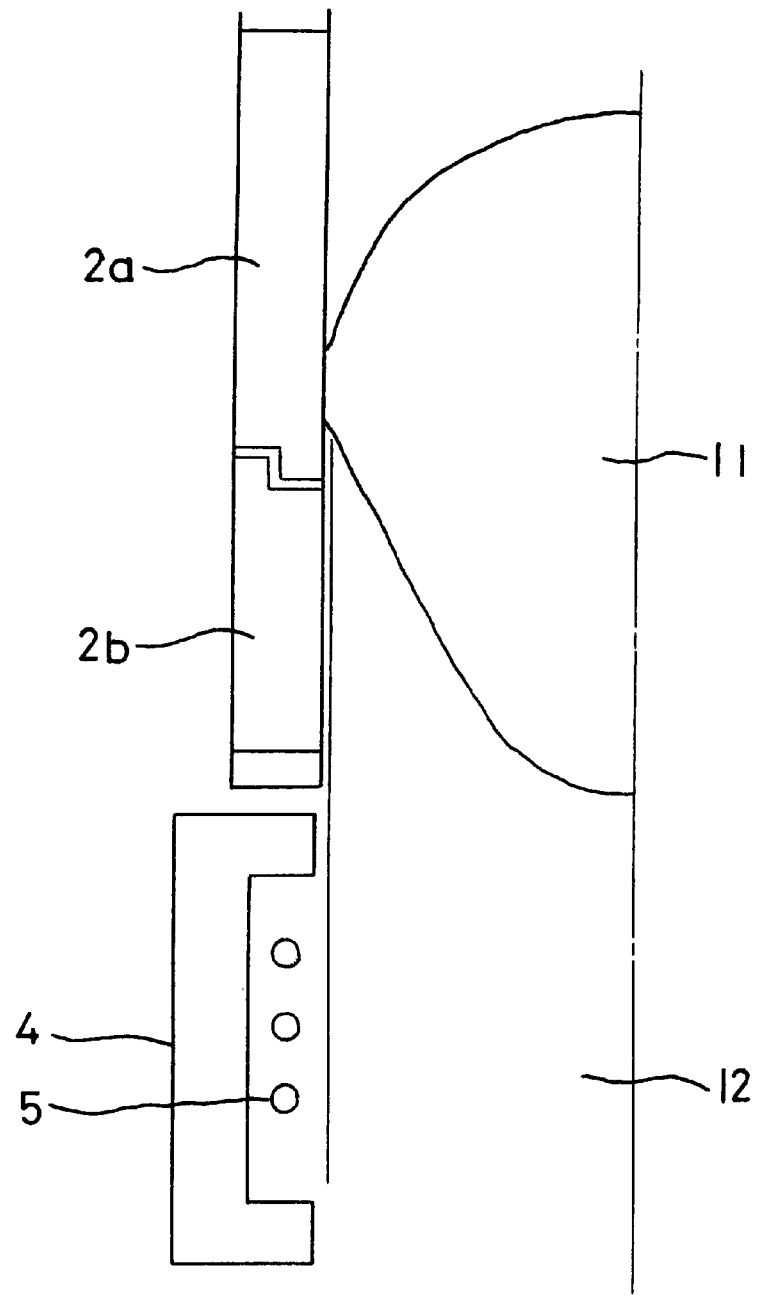
FIG. 5 is a vertical section showing main members of an electromagnetic induction casting apparatus according to a third embodiment of the present invention.

FIG. 5 is a vertical section showing main members of an electromagnetic induction casting apparatus according to a third embodiment of the present invention.

In the electromagnetic induction casting apparatus according to the third embodiment, a bottomless crucible 2 is configured as an assembling type which can be separated into a water-cooled section 2a and a non-water-cooled section 2b. For positioning at an assembly time, the water-cooled section 2a and the non-water-cooled section 2b have fitting structures consisting of a combination of a convex portion and a concave portion.

When the bottomless crucible 2 requires restoring deformation which has been accumulated for long term use, the assembling type bottomless crucible permits disassembling either of the water-cooled section 2a or the non-water-cooled section 2b, thereby simplifying a restoring work. Similarly, the assembling type bottomless crucible simplifies an exchange work and lowers a cost required for exchange. An effect to prevent the water-cooled section 2a from being deformed outside can be obtained by configuring the bottomless crucible 2 to have a structure in which a convex portion formed on an inner circumferential portion of a bottom surface of the water-cooled section 2a is fitted in a concave portion formed in an inner circumferential portion of a top surface of the non-water-cooled section 2b as shown in FIG. 5. By the way, the water-cooled section 2a may be loaded from the melt 11 formed therein and has a relatively high possibility of being deformed outward.

EXAMPLES

Now, examples of the present invention will be compared with a conventional example to clarify effects of the present invention.

As Example 1, a unidirectionally solidified polysilicon ingot to be used in a solar cell was manufactured using the electromagnetic induction casting apparatus according to the first embodiment shown in FIGS. 1 through 3. A casting speed was 2 mm/min.

A bottomless crucible used had an inside diameter of 300 mm, a total height of 500 mm, a total slit length of 350 mm and slits in a number of 22. A water-cooled section as an upper portion of the crucible was made of copper and had a height of 390 mm. On the other hand, a non-water-cooled section as a lower portion of the crucible was made of molybdenum and had a height of 110 mm. Furthermore, the water-cooled section had a slit length of 250 mm and the non-water-cooled section had a slit length of 100 mm. A lowermost portion 10 mm in height of the non-water-cooled section had no slit to assure mechanical strength of the lower portion of the crucible. An induction coil was disposed only outside the water-cooled section.

In this example, a temperature gradient of a solidified ingot was approximately 20° C./cm in a temperature range from 1420° C. to 1200° C.

An induction coil was newly disposed outside a non-water-cooled section as Example 2. Other conditions remained unchanged from those in Example 1. A heating temperature control operation using the newly disposed coil restricted a temperature gradient to approximately 18° C./cm in the temperature range from 1420° C. to 1200° C. of a solidified ingot.

A bottomless crucible which was made entirely of water-cooled copper was used as a conventional example. Other conditions including dimensions of the bottomless crucible were the same as those in Example 1. A temperature gradient of a solidified ingot was approximately 25° C./cm in the temperature range from 1420° C. to 1200° C.

Figure 6:
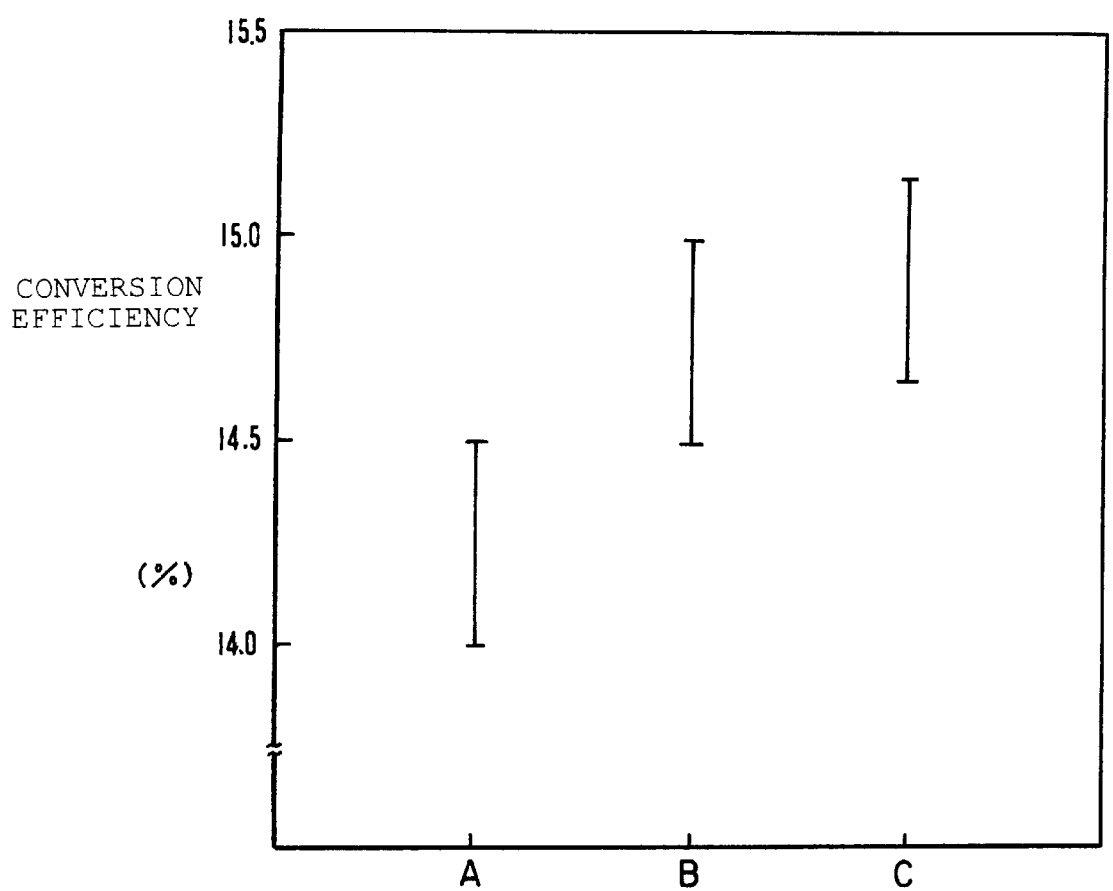
FIG. 6 is a graph showing photoelectric conversion efficiencies of solar cells manufactured in the examples of the present invention and a conventional example.
Figure 7:
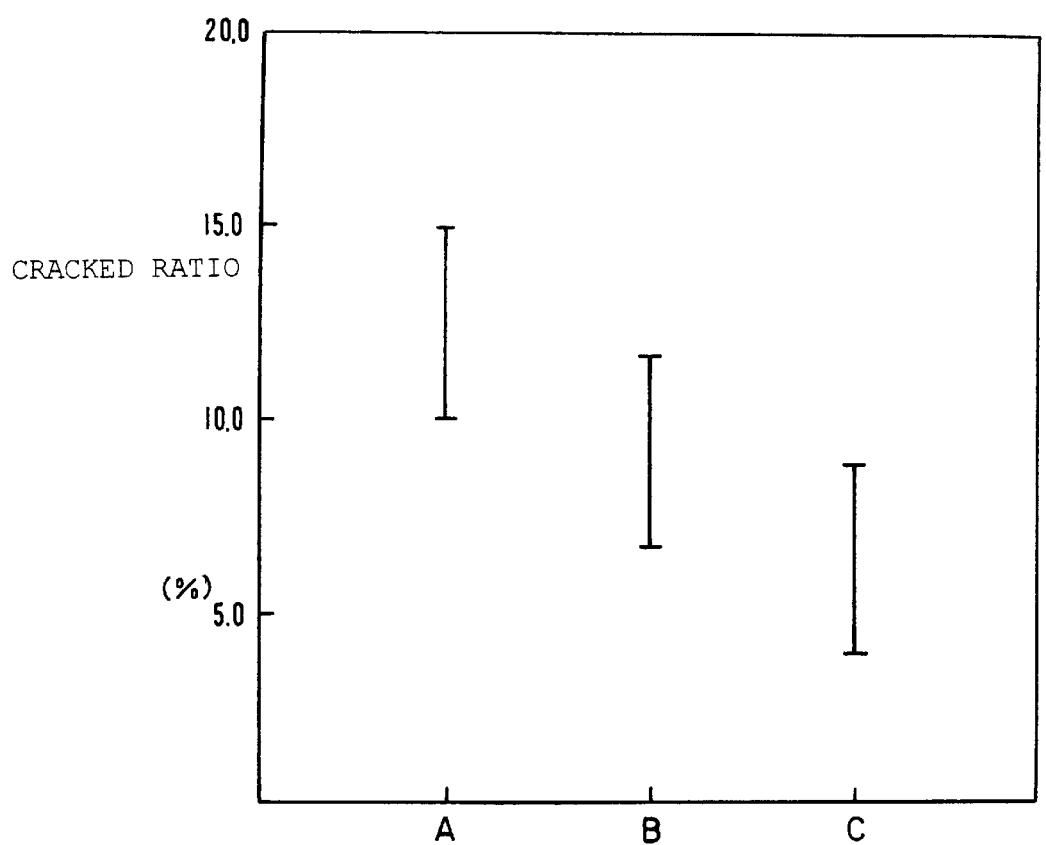
FIG. 7 is a graph showing cracking ratios of the solar cells manufactured in the examples of the present invention and the conventional example.
Figure 8:
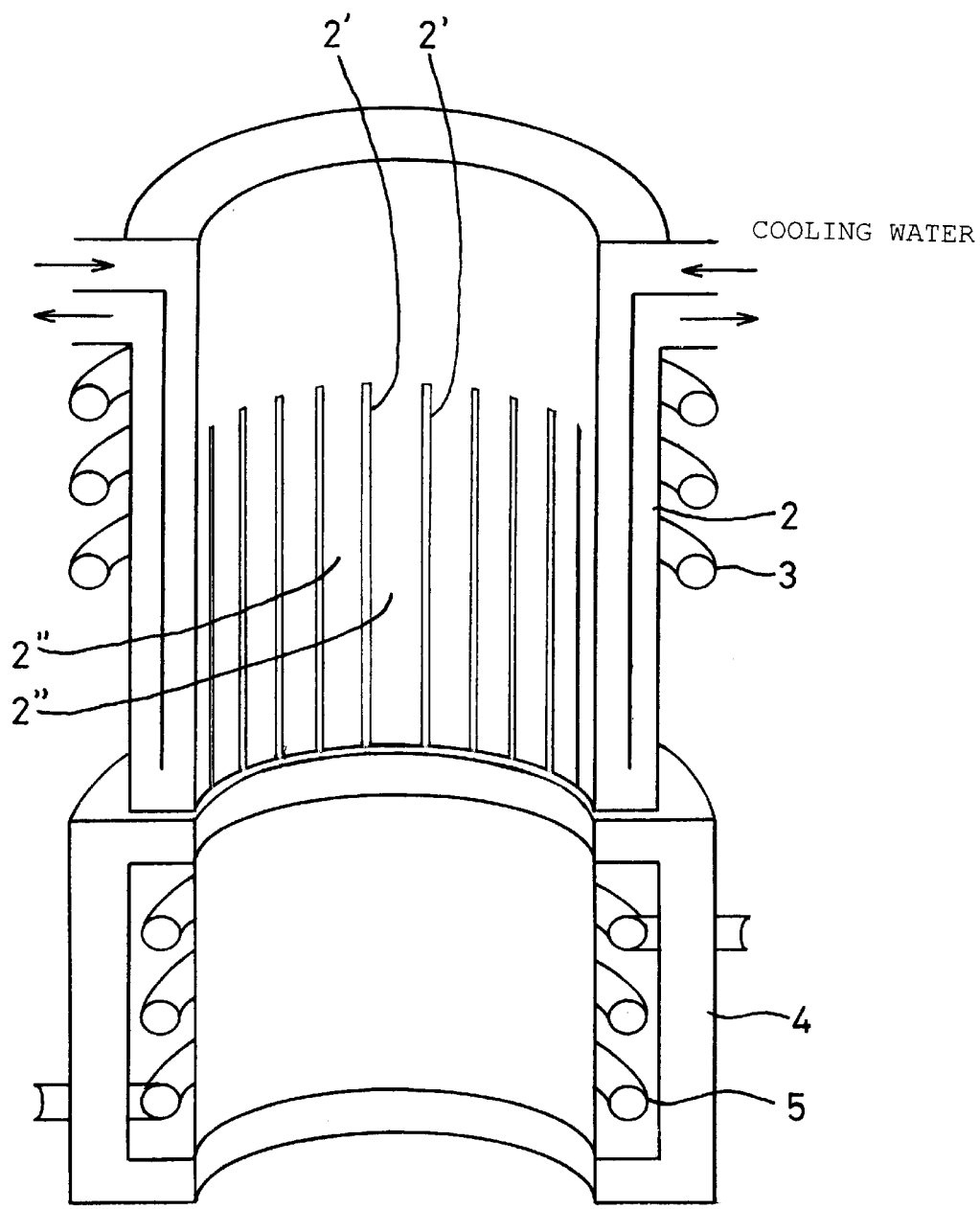
FIG. 8 is an oblique section showing main embers of a conventional electromagnetic induction casting apparatus.

FIG. 6 shows results obtained by manufacturing solar cells from the silicon ingots manufactured in the examples and investigating photoelectric conversion efficiencies of the solar cells. Furthermore, a cracking ratio in each casting is shown in FIG. 7. In these figures, reference character A denotes the conventional example, reference character B denotes Example 1 and reference character C denotes Example 2.

When the bottomless crucible made entirely of water-cooled copper was used, the temperature gradient could not be restricted to a low level in the temperature range from 1420° C. to 1200° C. of the solidifed ingot even when the heat insulating furnace was used. By configuring the upper section and the lower section of the bottomless crucible as the water-cooled section and the non-water-cooled section, the temperature gradient was lowered and a photoelectric conversion efficiency was improved. Furthermore, cracking was restricted. By disposing the induction coils outside both the water-cooled section and the non-water-cooled section, the temperature gradient was further lowered and the photoelectric conversion efficiency was further improved. Furthermore, the cracking ratio was further lowered.

The electromagnetic induction casting apparatus according to the present invention which uses the bottomless crucible having the upper section and the lower section configured as the water-cooled section and the non-water-cooled section is capable of avoiding rapid cooling due to water cooling in the lower section of the bottomless crucible. Furthermore, the electromagnetic induction casting apparatus is capable of moderating an rapid temperature change from the bottomless crucible to the heat insulating furnace, thereby preventing a temperature gradient from being partially improved due to the temperature change. Owing to the avoidance of the rapid cooling and the prevention of the partial improvement of the temperature gradient, the electromagnetic induction casting apparatus is capable of restricting a temperature gradient to a low level in the temperature range from 1420° C. to 1200° C. which produces a large influence on the performance, for example, of a silicon ingot as a solar cell, thereby improving the performance. Furthermore, the electromagnetic induction casting apparatus is capable of preventing the silicon ingot from being cracked, thereby improving an yield.

What is claimed is:

1. An electromagnetic induction casting apparatus for electromagnetically melting a raw material in an electrically conductive bottomless crucible which is disposed inside an induction coil and has at least a vertical portion divided by vertical slits into a plurality of portions in a circumferential direction, and pulling out the melt of raw material downward while allowing the raw material to be solidified, wherein an upper section and a lower section of said electrically conductive bottomless crucible are configured as a water-cooled section and a non-water-cooled section, and at least vertical portions of both the water-cooled section and the non-water-cooled section are divided by vertical slits into a plurality of portions in the circumferential direction.

2. The electromagnetic induction casting apparatus according to claim 1, wherein said electrically conductive bottomless crucible has slits which are formed by connecting the slits in the water-cooled section and the non-water-cooled section to each other and continuous from the water-cooled section to the non-water-cooled section.

3. The electromagnetic induction casting apparatus according to claim 1 or 2, wherein said water-cooled section is made of an electrically conductive material having a high heat conductivity and said non-water-cooled section is made of an electrically conductive material having a high melting point.

4. The electromagnetic induction casting apparatus according to claim 1 or 2, wherein said induction coil is disposed independently outside the water-cooled section and outside the non-water-cooled section of said electrically conductive bottomless crucible, respectively.

5. The electromagnetic induction casting apparatus according to claim 1 or 2, wherein said electrically conductive bottomless crucible is of an assembling type which is separable into the water-cooled section and the non-water-cooled section.

6. The electromagnetic induction casting apparatus according to claim 3, wherein said induction coil is disposed independently outside the water-cooled section and outside the non-water-cooled section of said electrically conductive bottomless crucible, respectively.

7. The electromagnetic induction casting apparatus according to claim 3, wherein said electrically conductive bottomless crucible is of an assembling type which is separable into the water-cooled section and the non-water-cooled section.

8. The electromagnetic induction casting apparatus according to claim 4, wherein said electrically conductive bottomless crucible is of an assembling type which is separable into the water-cooled section and the non-water-cooled section.

* * * * *